US012755714B2

(12) United States Patent
Kim et al.

(10) Patent No.: US 12,755,714 B2
(45) Date of Patent: *Oct. 6, 2026

(54) DATA INTEGRATED CIRCUIT INCLUDING LATCH CONTROLLED BY CLOCK SIGNAL AND DISPLAY DEVICE INCLUDING THE SAME

(71) Applicant: SAMSUNG DISPLAY CO., LTD., Yongin-si (KR)

(72) Inventors: Wontae Kim, Cheongju-si (KR); Sooyeon Kim, Seoul (KR); Young-Il Ban, Hwaseong-si (KR); Sunkyu Son, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,153

(22) Filed: Jan. 29, 2025

(65) Prior Publication Data

US 2025/0174209 A1 May 29, 2025

Related U.S. Application Data

(63) Continuation of application No. 18/050,080, filed on Oct. 27, 2022, now Pat. No. 12,223,926, which is a (Continued)

(30) Foreign Application Priority Data

Mar. 9, 2015 (KR) ........................ 10-2015-0032720

(51) Int. Cl.
*G09G 3/36* (2006.01)

(52) U.S. Cl.
CPC ......... *G09G 3/3688* (2013.01); *G09G 3/3611* (2013.01); *G09G 2310/0286* (2013.01);

(Continued)

(58) Field of Classification Search
CPC .................................................... G09G 3/3688
See application file for complete search history.

(56) References Cited

U.S. PATENT DOCUMENTS

| | | | |
|---|---|---|---|
| 11,488,560 | B2 | 11/2022 | Kim et al. |
| 2002/0140367 | A1 | 10/2002 | Matsumoto |

(Continued)

FOREIGN PATENT DOCUMENTS

| | | |
|---|---|---|
| JP | 2006-267999 | 10/2006 |
| KR | 1020050001790 | 1/2005 |

(Continued)

OTHER PUBLICATIONS

Notice of Allowance dated Jun. 28, 2022 in corresponding U.S. Appl. No. 16/794,787.

(Continued)

*Primary Examiner* — William Boddie
*Assistant Examiner* — Andrew B Schnirel
(74) *Attorney, Agent, or Firm* — F. CHAU & ASSOCIATES, LLC

(57) ABSTRACT

Provided is a data integrated circuit including: a data driving circuit, a shift register configured to output a plurality of latch clock signals, a latch configured to latch a plurality of image signals in response to the plurality of latch clock signals and output a plurality of digital image signals in response to a plurality of latch output signals, and a clock generator configured to divide a main clock signal into the plurality of latch output signals and output the plurality of divided latch output signals to the latch. At least two of the latch output signals are activated at different time intervals.

18 Claims, 7 Drawing Sheets

Related U.S. Application Data continuation of application No. 16/794,787, filed on Feb. 19, 2020, now Pat. No. 11,488,560, which is a continuation of application No. 14/863,929, filed on Sep. 24, 2015, now abandoned.

(52) U.S. Cl.
CPC . *G09G 2310/08* (2013.01); *G09G 2320/0223* (2013.01); *G09G 2370/08* (2013.01)

(56) References Cited

U.S. PATENT DOCUMENTS

| | | | |
|---|---|---|---|
| 2004/0189579 | A1 | 9/2004 | Shimizu |
| 2004/0212631 | A1 | 10/2004 | Toriumi et al. |
| 2006/0114191 | A1 | 6/2006 | Choi |
| 2006/0193002 | A1 | 8/2006 | Satou et al. |
| 2008/0068360 | A1 | 3/2008 | Fukuo |
| 2008/0117190 | A1 | 5/2008 | Chen et al. |
| 2008/0191980 | A1 | 8/2008 | Jeon |
| 2009/0058838 | A1 | 3/2009 | Lee et al. |
| 2014/0062995 | A1 | 3/2014 | Kim et al. |
| 2015/0049076 | A1 | 2/2015 | Kim et al. |
| 2015/0138254 | A1 | 5/2015 | Nakayama et al. |
| 2015/0221274 | A1 | 8/2015 | Ishii |
| 2015/0221276 | A1 | 8/2015 | Ishii |
| 2016/0063957 | A1 | 3/2016 | Shirasaki |
| 2016/0267871 | A1 | 9/2016 | Kim et al. |
| 2017/0047001 | A1 | 2/2017 | Shin et al. |
| 2020/0184918 | A1 | 6/2020 | Kim et al. |
| 2023/0075010 | A1 | 3/2023 | Kim et al. |

FOREIGN PATENT DOCUMENTS

| | | |
|---|---|---|
| KR | 1020080108698 | 12/2008 |
| KR | 1020090022052 | 3/2009 |
| KR | 1020100077741 | 7/2010 |
| KR | 1020120002011 | 1/2012 |
| KR | 1020140031760 | 3/2014 |
| KR | 1020140067549 | 6/2014 |

OTHER PUBLICATIONS

Office Action dated Sep. 4, 2020 in corresponding U.S. Appl. No. 16/794,787.

US Final Office Action Dated Dec. 14, 2018 in Corresponding U.S. Appl. No. 14/863,929.

US Office Action Dated May 16, 2019 in Corresponding U.S. Appl. No. 14/863,929.

US Office Action Dated Jul. 7, 2017 in Corresponding U.S. Appl. No. 14/863,929.

| Ts | Phase Difference |
|---|---|
| 00 | P1 |
| 01 | P2 |
| 10 | P3 |
| 11 | P4 |

DATA INTEGRATED CIRCUIT INCLUDING LATCH CONTROLLED BY CLOCK SIGNAL AND DISPLAY DEVICE INCLUDING THE SAME

CROSS-REFERENCE TO RELATED APPLICATIONS

This U.S. non-provisional patent application is a continuation of U.S. patent application Ser. No. 18/050,080 filed Oct. 27, 2022, which is a continuation of U.S. patent application Ser. No. 16/794,787 filed Feb. 19, 2020, issued as U.S. Pat. No. 11,488,560 on Nov. 1, 2022, which is a continuation of U.S. patent application Ser. No. 14/863,929 filed Sep. 24, 2015, which claims priority under 35 U.S.C. § 119 to Korean Patent Application No. 10-2015-0032720, filed on Mar. 9, 2015, the disclosures of which are incorporated by reference herein.

BACKGROUND

1. Technical Field

The present disclosure relates to a display device, and more particularly, to a display device including a data integrated circuit (IC).

2. Discussion of Related Art

A display device includes a display panel for displaying an image and a data driving circuit and gate driving circuit for driving the display panel. The display panel includes a plurality of gate lines, a plurality of data lines, and a plurality of pixels. Each of the pixels includes a thin film transistor, a liquid crystal capacitor, and a storage capacitor. The data driving circuit outputs data driving signals to the data lines and the gate driving circuit outputs gate driving signals for driving the gate lines.

After applying a gate on voltage of a gate driving signal to a gate electrode of a thin film transistor of a pixel connected to a gate line, the display device may display an image by applying a data voltage corresponding to the image to a source electrode of the thin film transistor. However, signal delay can occur on a delivery path of a gate driving signal outputted from the gate driving circuit. Accordingly, a charging rate of liquid crystal capacitors disposed further from the gate driving circuit can be lower than that of liquid crystal capacitors disposed closer thereto. As a result, image quality may become uneven in one display panel.

SUMMARY

At least one embodiment of the present disclosure provides a data integrated circuit for adjusting an output timing of data voltages and a display device including the same.

According to an exemplary embodiment of the inventive concept, data integrated circuits are provided including: a data driving circuit; a shift register configured to output a plurality of latch clock signals; a latch circuit configured to latch a plurality of image signals in response to the plurality of latch clock signals and output a plurality of digital image signals in response to a plurality of latch output signals; and a clock generator configured to divide a main clock signal into the plurality of latch output signals and output the plurality of divided latch output signals to the latch unit. At least two of the latch output signals are activated at different time intervals.

In an embodiment, each of the latch output signals has a different phase difference.

In an embodiment, the latch circuit includes a plurality of latch groups having at least one latch.

In an embodiment, each latch group simultaneously outputs a subset of the digital image signals.

In an exemplary embodiment, at least two of the latch groups simultaneously output a subset of the digital image signals in response to a latch output signal having the same phase.

In an exemplary embodiment, the clock generator determines an activation state of each of the latch output signals in response to an external output control signal.

In an exemplary embodiment, the clock generator performs a control to sequentially activate the latch output signals in response to the output control signal.

In an exemplary embodiment, the clock generator performs a control to simultaneously activate at least two of the latch output signals in response to the output control signal.

In an exemplary embodiment, the clock generator adjusts a phase difference between the latch output signals in response to an external delay signal.

According to an exemplary embodiment of the inventive concept, a display device includes: a timing controller configured to output a main clock signal; and a data driving circuit including a plurality of data integrated circuit outputting a plurality of data voltages based on the main clock signal, wherein each data integrated circuit includes: a shift register configured to output a plurality of latch clock signals; a latch circuit configured to latch a plurality of image signals in response to the plurality of latch clock signals and output a plurality of digital image signals in response to a plurality of latch output signals; and a clock generator configured to divide the main clock signal into the plurality of latch output signals and output the plurality of divided latch output signals to the latch unit. At least two of the latch output signals are activated at different time intervals.

In an embodiment, the timing controller further outputs an output control signal and the clock generator performs a control that causes the latch output signals to have respectively different phases in response to the output control signal.

In an exemplary embodiment, the timing controller outputs an output control signal and the clock generator outputs at least two of the latch output signals having the same phase among the latch output signals.

In an embodiment, the timing controller further outputs a delay signal and the clock generator adjusts a phase difference between the latch output signals in response to the delay signal.

In an exemplary embodiment, the latch circuit includes a plurality of latch groups having at least one latch and each latch group simultaneously outputs a subset of the digital image signals.

In an exemplary embodiment, the clock generator outputs the latch output signals in a direction from both ends of the each data integrated circuit to one point of a left or right on the basis of a center part of the each data integrated circuit.

According to an exemplary embodiment of the inventive concept, a data integrated circuit includes a shift register configured to output a plurality of latch clock signals, a latch circuit configured to latch a plurality of image signals in response to the plurality of latch clock signals and output a plurality of digital image signals in response to a plurality of latch output signals, and a clock generator configured to generate a plurality of latch output signals from a main clock signal and output the plurality of latch output signals to the latch. The main clock signal is active during an entire period. Each latch output signal is active during part of the period and inactive during a part of the period.

In an embodiment, the latch circuit outputs a first image signal among the image signals when a first latch output signal among the latch output signals is active, and the latch circuit does not output the first output image signal when the first latch output signal is inactive.

In an embodiment, a phase difference is present between the latch output signals.

In an embodiment, the clock generator is configured to receive a control signal that indicates the phase difference.

In an embodiment, the control signal includes a two bit value that represents the phase difference.

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION

Figure 1:
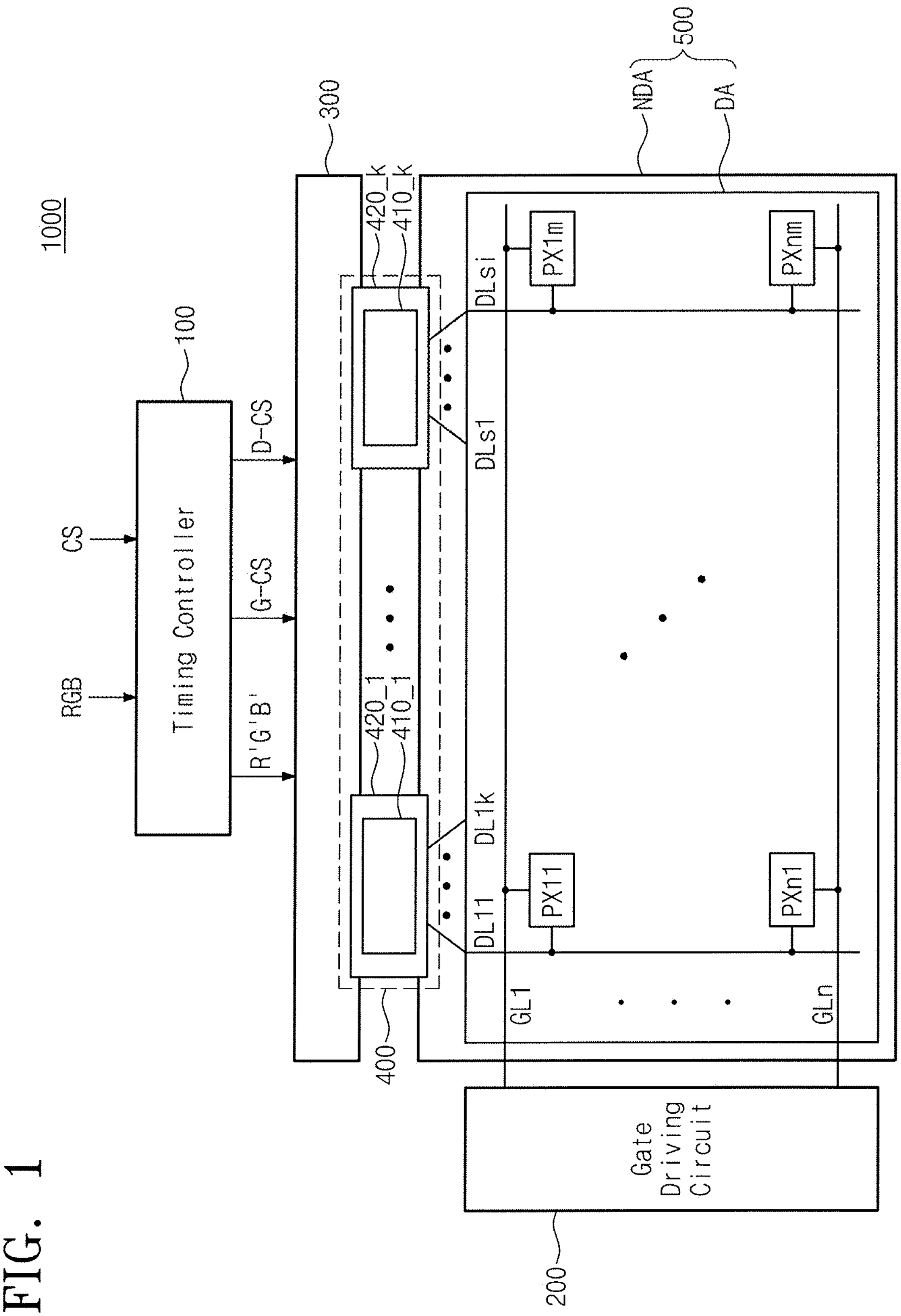
FIG. 1 is a block diagram illustrating a display device according to an exemplary embodiment of the inventive concept.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art.

Unless otherwise noted, like reference numerals refer to like elements throughout the attached drawings and written description. In the drawings, the thickness or size of each layer may be exaggerated, omitted, or schematically illustrated for convenience in description and clarity. The terms of a singular form may include plural forms unless they have a clearly different meaning in the context. For example, the singular forms "a", "an" and "the" are intended to include the plural forms as well, unless the context clearly indicates otherwise.

FIG. 1 is a block diagram illustrating a display device according to an exemplary embodiment of the inventive concept.

Referring to FIG. 1, a display device 1000 includes a timing controller 100, a gate driving circuit 200, a printed circuit board 300, a data driving circuit 400, and a display panel 500.

The timing controller 100 receives a plurality of image signals RGB and a plurality of control signals CS from the outside of the display device 1000. The image signal RGB may include red, green, and blue image data. The timing controller 100 converts the data format of the image signals RGB to correspond with an interface specification of the data driving circuit 400. The conversion results in a plurality of converted image signals R'G'B'. The timing controller 100 provides the plurality of converted image signals R'G'B' to the printed circuit board 300.

The timing controller 100 may output a plurality of driving signals in response to external control signals CS. For example, the timing controller 100 may generate data control signals D-CS and gate control signals G-CS as a plurality of driving signals. The data control signals D-CS may include main clock signals, output start signals, output control signals, and delay signals. The gate control signals G-CS may include vertical start signals and vertical clock bar signals.

The timing controller 100 delivers the data control signals D-CS to the data driving circuit 400 through the printed circuit board 300. Additionally, the timing controller 100 delivers the gate control signals G-CS to the gate driving circuit 200 through the printed circuit board 300. Herein the timing controller 100 may deliver the gate control signals G-CS to the gate driving circuit 200 through any one flexible circuit board 420_*k* of the data driving circuit 400.

The gate driving circuit 200 generates a plurality of gate signals in response to the gate control signal G-CS provided from the timing controller 100. The gate signals are provided to pixels PX11 to PXnm sequentially and by a row unit through gate lines GL1 to GLn. As a result, the pixels PX11 to PXnm may be driven by the row unit.

According to an exemplary embodiment of the inventive concept, the gate driving circuit 200 is implemented with an amorphous silicon gate (ASG) using an amorphous Silicon Thin Film Transistor (a-Si TFT) and a circuit using an oxide semiconductor, a crystalline semiconductor, and a polycrystalline semiconductor. In this case, the gate driving circuit 200 may be integrated into a non display area NDA of the display panel 500. According to an embodiment of the inventive concept, the gate driving circuit 200 is implemented with a tape carrier package (TCP) or a chip on film (COF).

The printed circuit board 300 may be electrically connected to the timing controller 100 and the data driving circuit 400 and may include various circuits for driving the display panel 500. Additionally, the printed circuit board 300 may include a plurality of wirings for connecting the timing controller 100, the gate driving circuit 200 and the data driving circuit 400 to each other.

The data driving circuit 400 receives the converted image signals R'G'B' and the data control signals D-CS outputted from the timing controller 100 through the printed circuit board 300. The data driving circuit 400 generates a plurality of data voltages corresponding to the converted image signals R'G'B' in response to the data control signals D-CS.

The data driving circuit 400 provides the data voltages to the plurality of pixels PX11 to PXnm through a plurality of data lines DL11 to DLsi.

In more detail, the data driving circuit 400 includes a plurality of data integrated circuits 410_1 to 410_*k* and a plurality of flexible circuit boards 420_1 to 420_*k*. Herein, k is an integer greater than 0 and less than m.

According to an embodiment of the inventive concept, the data integrated circuits 410_1 to 410_*k* are mounted on the flexible circuit boards 420_1 to 420_*k* through a Tape Carrier Package (TCP) method. In an exemplary embodiment, the flexible circuit boards 420_1 to 420_*k* are connected to the printed circuit board 300 and the non display area NDA adjacent to the top of a display area DA.

According to an embodiment of the inventive concept, the data integrated circuits 410_1 to 410_*k* are mounted on the flexible circuit boards 420_1 to 420_*k* through a Chip on film (COF) method.

The display panel 500 includes a display area DA displaying an image and a non display area NDA adjacent to the periphery of the display area DA. For example, the non display area NDA may surround the display area DA.

The display panel 500 may include a plurality of pixels PX11 to PXnm disposed in the display area DA. Additionally, the display panel 500 includes gate lines GL1 to GLn and intersecting data lines DL11 to DLsi insulated from the gate lines GL1 to GLn.

The gate lines GL1 to GLn may be connected to the gate integrated circuit 200 to receive sequential gate signals. The data lines DL11 to DLsi may be connected to the data driving circuit 400 to receive data voltages.

The pixels PX11 to PXnm are formed in an area where the gate lines GL1 to GLn and the data lines DL11 to DLsi intersect. Accordingly, the pixels PX11 to PXnm may be arranged in n rows and m columns, which intersect each other. Herein, n and m are integers greater than 0.

The pixels PX11 to PXnm are respectively connected to the corresponding gate lines GL1 to GLn and the corresponding data lines DL11 to DLsi. The pixels PX11 to PXnm receive data voltages through the data lines DL11 to DLsi in response to gate signals provided from the gate lines GL1 to GLn. As a result, the pixels PX11 to PXnm may display grayscales corresponding to the data voltages.

The gate driving circuit 200 drives the gate lines GL1 to GLn in response to the gate control signal G-CS provided from the timing controller 100. Additionally, the driving circuit 200 may receive a gate on voltage (not shown) from the outside. While the gate on voltage is applied to the gate driving circuit 200, one row of TFTs connected to one gate line may be turned on.

In this case, the data integrated circuits 410_1 to 410_*k* provide a plurality of data voltages to the data lines DL11 to DLsi. The data voltages supplied to the data lines DL11-DLsi are applied to corresponding pixels through the turned-on TFTs. In the following, a period in which one row of TFTs connected to one gate line are turned on is referred to as one horizontal period (hereinafter referred to as 1H).

Figure 2:
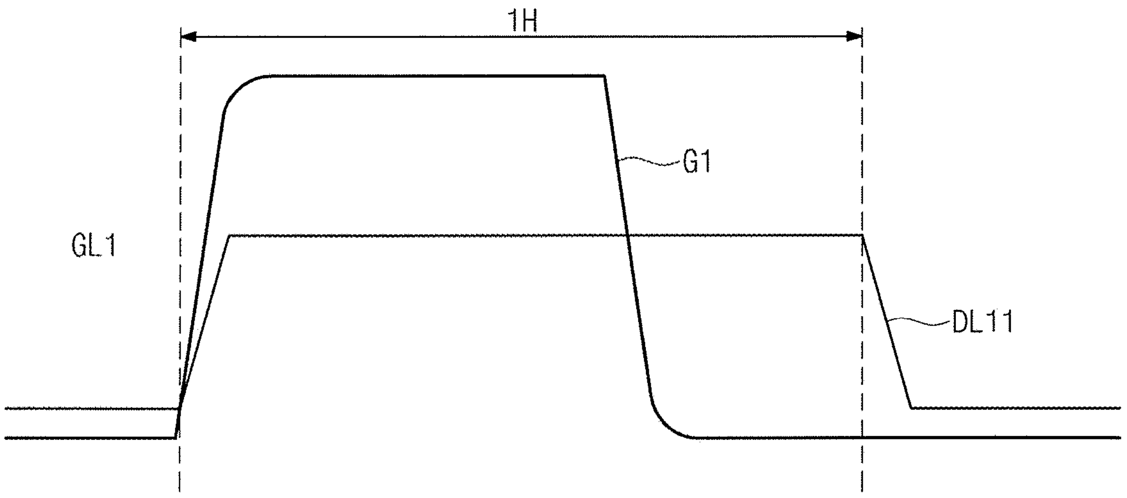
FIG. 2 is a view illustrating a relationship of a data voltage and a gate signal provided to a pixel closest to a gate driving circuit.
Figure 3:
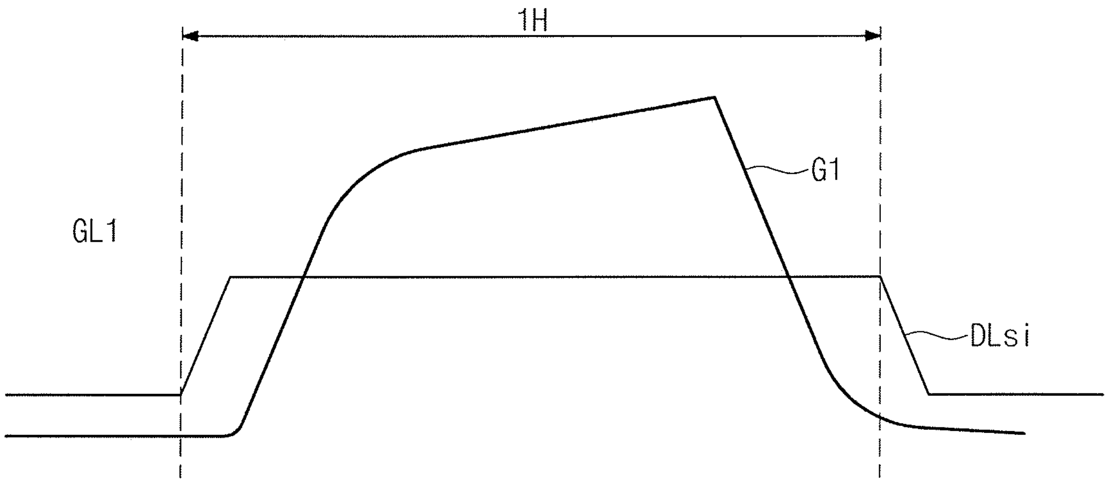
FIG. 3 is a view illustrating a relationship of a data voltage and a gate signal provided to a pixel farthest from a gate driving circuit.

FIGS. 2 and 3 are views illustrating a data driving signal and a gate signal provided to one of gate lines shown in FIG. 1. FIG. 2 is a view illustrating a relationship of a data voltage and a gate signal provided to a pixel closest to a gate driving circuit. FIG. 3 is a view illustrating a relationship of a data voltage and a gate signal provided to a pixel farthest from the gate driving circuit.

Referring to FIGS. 1 to 3, gate signals generated from the gate driving circuit 200 of FIG. 1 are transmitted through the gate lines GL1 to GLn. Hereinafter, it is described with reference to FIGS. 2 and 3 that a first gate signal G1 is provided to a first gate line GL1.

A first pixel PX11 is connected to the first gate line GL1 and the first data line DL11 and a second pixel PX1*m* is connected to the first gate line GL1 and the ith data line DLSi. As shown in FIGS. 2 and 3, when the first gate signal G1 outputted from the gate driving circuit 200 is provided to the mth pixel PX1*m* farther than the first pixel PX11 in a row direction, a predetermined time may be delayed.

That is, the first gate signal G1 is not simultaneously provided to the first pixel PX11 and the mth pixel PX1*m* and is delayed by a predetermined time. As a result, a charging rate of the second pixel PX1*m* farther than the first pixel PX11 in a row direction may deteriorate.

Additionally, a plurality of data voltages outputted from each data integrated circuit may not be applied to corresponding pixels simultaneously. In general, each data integrated circuit simultaneously outputs data voltages to corresponding lines among the plurality of data lines DL11 to DLsi. However, data voltages outputted from each data integrated circuit may not be simultaneously applied to corresponding pixels due to wiring resistances and external elements. That is, the time at which a data voltage is applied to each pixel may vary.

According to an embodiment of the inventive concept, the data integrated circuits 410_1 to 410_*k* control the output timing of data voltages outputted to corresponding data lines in consideration of such a signal delay. That is, the data integrated circuits 410_1 to 410_*k* do not simultaneously output data voltages to data lines and separately output them on the basis of a signal delay.

Figure 4:
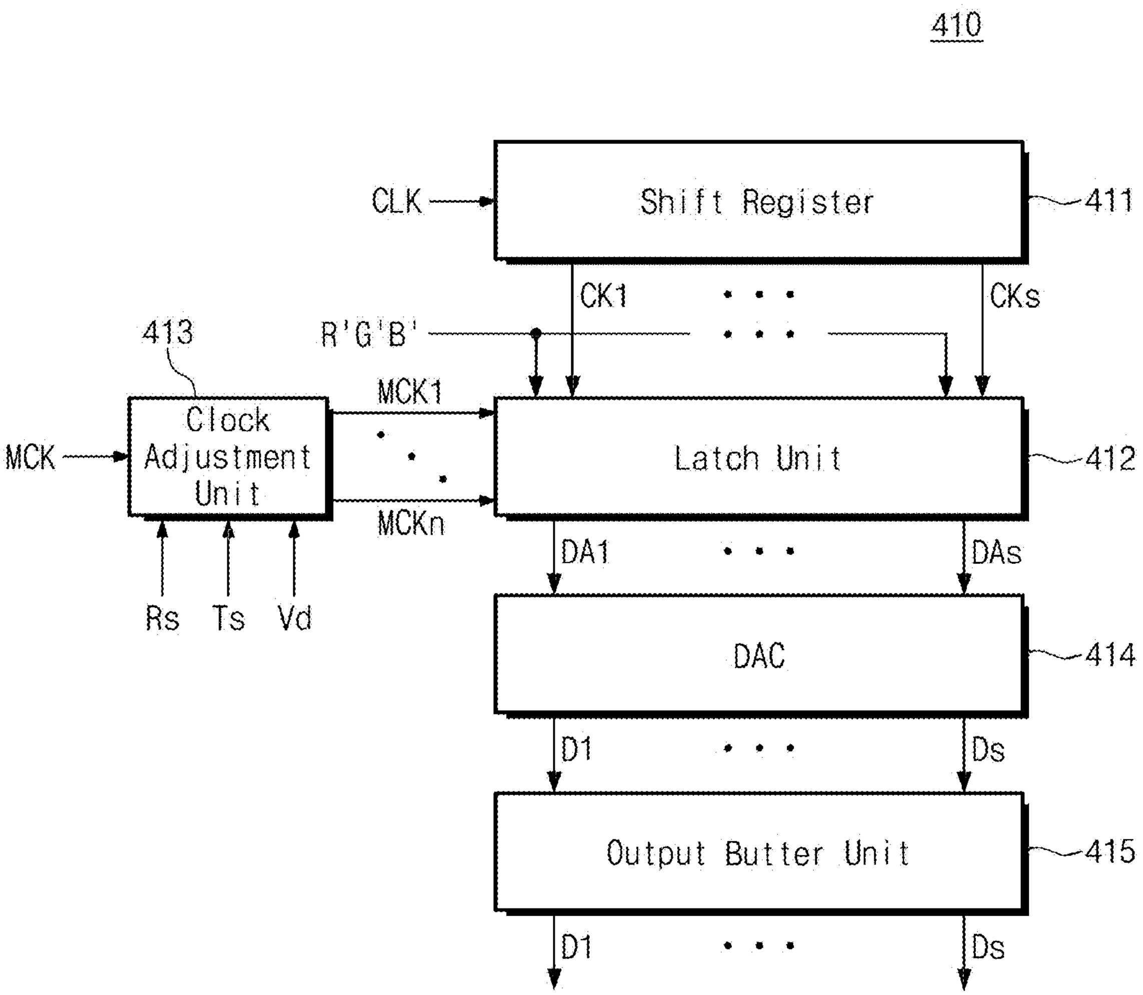
FIG. 4 is a block diagram illustrating a data integrated circuit shown in FIG. 1 according to an exemplary embodiment of the inventive concept.

FIG. 4 is a block diagram illustrating a data integrated circuit shown in FIG. 1 according to an exemplary embodiment of the inventive concept.

A data integrated circuit 410_*k* shown in FIG. 4 may be one data integrated circuit among the plurality of data integrated circuits 410_1 to 410_*k* shown in FIG. 1. For example, although one data integrated circuit 410_*k* is described with reference to FIG. 4, a configuration and operation method of each data integrated circuit may be the same.

First, referring to FIG. 4, the data integrated circuit 410_*k* includes a shift register 411, a latch unit 412 (e.g., latch circuit), a clock adjustment unit 413 (e.g., a clock generator), a digital to analog converter 414, and an output buffer unit 415. Additionally, a clock signal CLK, image signals R'G'B', and a main clock signal MCK shown in FIG. 4 may be included in a data control signal D-CS provided from the timing controller 100 of FIG. 1. However, the inventive concept is not limited thereto as the data control signal D-CS may include various control signals. In an exemplary embodiment, the shift register 411 includes a cascade of flip flops, sharing the same clock signal CLK, in which the output of each flip-flop is connected to the data input of the next flip-flop in the chain.

The shift register 411 sequentially activates a plurality of latch clock signals CK1 to CKs in response to a clock signal CLK. In an exemplary embodiment, the latch unit 412 includes a plurality of D flip-flops, where a portion of the image signals R'G'B' (e.g., red data, green data, or blue data) is applied to the data terminal of the flip-flop, and a clock terminal of the flip-flop receives a different one of the latch clock signals CK1 to CKs.

The latch unit 412 latches the image signals R'G'B' in response to latch clock signals CK1 to CKs provided from the shift register 411. According to an exemplary embodiment of the inventive concept, the latch unit 412 simultaneously outputs the latched image signals R'G'B' to the digital to analog converter 414 or provide them separately with a predetermined time difference. According to an exemplary embodiment of the inventive concept, from the viewpoint that the latched image signals R'G'B' are outputted from the latch unit 412, the latched image signals R'G'B' are defined as digital image signals DA1 to DAs. That is, the latch unit 412 adjusts the output timing of the digital image signals DA1 to DAs in response to a plurality of first to nth latch output signals MCK1 to MCKn provided from the clock adjustment unit 413. This will be described in more detail with reference to FIG. 5.

The clock adjustment unit 413 receives a main clock signal MCK, an output start signal Rs, an output control signal Vd, and a delay signal Ts from the timing controller 100. In an exemplary embodiment, the main clock signal MCK, the output start signal Rs, the output control signal Vd, and the delay signal Ts are included in the data control signal D-CS.

The clock adjustment unit 413 divides the main latch signal MCK into the first to nth latch output signals MCK1 to MCKn. The clock adjustment unit 413 outputs the first to nth latch output signals MCK1 to MCKn to the latch unit 412 in response to the output start signal Rs.

According to an exemplary embodiment of the inventive concept, the clock adjustment unit 413 adjusts a phase difference between the first to nth latch output signals MCK1 to MCKn in response to the delay signal Ts. As a result, the timing at which each latch output signal is activated may be adjusted according to the delay signal Ts. Herein, when a latch output signal is activated, a digital image signal is outputted from the latch unit 412. On the other hand, when a latch output signal is deactivated, a digital image signal is not outputted from the latch unit 412.

According to an exemplary embodiment of the inventive concept, the clock adjustment unit 413 controls an activation state of the first to nth latch output signals MCK1 to MCKn in response to the output control signal Vd. That is, according to the output control signal Vd, the order in which each of the first to nth latch output signals MCK1 to MCKn is output is determined.

The digital-analog converter 414 receives digital image signals DA1 to DAs from the latch unit 412. The digital-analog converter 414 converts the received digital image signals DA1 to DAs into a plurality of data voltages D1 to Ds. Moreover, although not shown in the drawing, the digital to analog converter 414 may receive a plurality of gamma voltages from the outside. The digital-analog converter 414 may output the data voltages D1 to Ds corresponding to the digital image signals DA1 to DAs on the basis of the gamma voltages.

The output buffer unit 415 receives the data voltages D1 to Ds from the digital to analog converter 414. The output buffer unit 415 provides the received data voltages D1 to Ds to corresponding data lines among the data lines DL11 to DLsi. The output buffer unit 415 may include one or more buffers. In an exemplary embodiment, a buffer is a buffer amplifier implemented using an operational amplifier.

Figure 5:
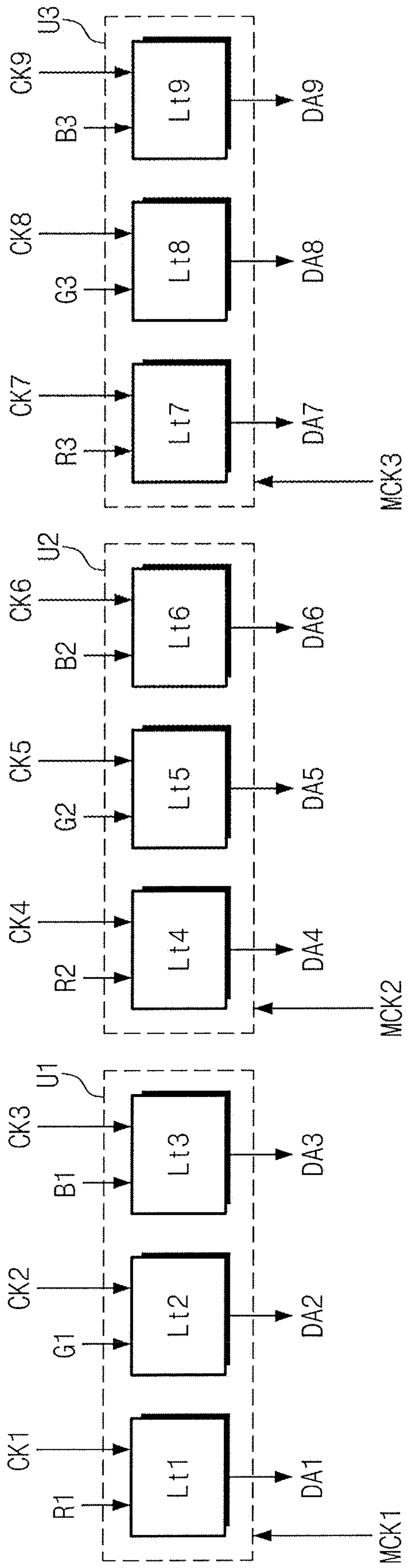
FIG. 5 is a block diagram illustrating a latch unit shown in FIG. 4.

FIG. 5 is a block diagram illustrating a latch unit shown in FIG. 4.

Referring to FIGS. 4 and 5, a latch unit 412 may include a plurality of latches. For example, the latches may be D-flip flops. The latches included in the latch unit 412 may be divided based on a plurality of latch groups. For example, hereinafter, it is described that each data integrated circuit 410_*k* is electrically connected to nine data lines. In this case, each data integrated circuit 410_*k* includes first to ninth latches Lt1 to Lt9 connected to nine data lines. That is, the number of latches included in each data integrated circuit 410_*k* may be provided in correspondence to the number of data lines that are electrically connected thereto.

In an exemplary embodiment, the first to ninth latches Lt1 to Lt9 form three latch groups. The first to third latches Lt1 to Lt3 form a first latch group U1. The fourth to sixth latches Lt4 to Lt6 form a second latch group U2. The seventh to ninth latches Lt7 to Lt9 form a third latch group U3.

Additionally, as mentioned above, the clock adjustment unit 413 divides a main clock signal MCK into a plurality of latch output signals of which at least part is activated in another section. For example, the main clock signal MCK is activated for a period, and at least two of the latch output signals are activated during different sections of the period. For example, hereinafter, it is described that the clock adjustment unit 413 divides the main latch signal MCK into first to third latch output signals MCK1 to MCK3. In this case, a plurality of latch groups output digital image signals, respectively, on the basis of the first to third latch output signals MCK1 to MCK3.

The first latch Lt1 latches a first red image signal R1 in response to a first latch clock signal CK1. The second latch Lt2 latches a first green image signal G1 in response to a second latch clock signal CK2. The third latch Lt3 latches a first blue image signal B1 in response to a third latch clock signal CK3. The first red, green, and blue image signals R1, G1, and B1 may be included in the image signals R'G'B' provided from the timing controller 100. In an exemplary embodiment, the first to third latches Lt1 to Lt3 simultaneously output (or output at substantially the same time) first to third digital image signals DA1 to DA3 on the basis of the first latch output signal MCK1. For example, R1, G1, and B1 may be applied to respective data terminals of the first group of latches, and CK1, CK2, and CK3 may be applied to clock terminals of the first group of latches.

The fourth latch Lt4 latches a second red image signal R2 in response to the fourth latch clock signal CK4. The fifth latch Lt5 latches a second green image signal G2 in response to the fifth latch clock signal CK5. The sixth latch Lt6 latches a second blue image signal B2 in response to the sixth latch clock signal CK6. The second red, green, and blue image signals R2, G2, and B2 may be included in the image signals R'G'B' provided from the timing controller 100. In an exemplary embodiment, the fourth to sixth latches Lt4 to Lt6 simultaneously output (or output at substantially the same time) fourth to sixth digital image signals DA4 to DA6 on the basis of the second latch output signal MCK2. For example, R2, G2, and B2 may be applied to respective data terminals of the second group of latches, and CK4, CK5, and CK6 may be applied to clock terminals of the second group of latches.

The seventh latch Lt7 latches a third red image signal R3 in response to the seventh latch clock signal CK7. The eighth latch Lt8 latches a third green image signal G3 in response to the eighth latch clock signal CK8. The ninth latch Lt9 latches a third blue image signal B3 in response to the ninth latch clock signal CK9. The third red, green, and blue image signals R3, G3, and B3 may be included in image signals R'G'B' provided from the timing controller 100. In an exemplary embodiment, the seventh to ninth latches Lt7 to Lt9 simultaneously output (e.g., or output at substantially the same time) seventh to ninth digital image signals DA7 to DA9 on the basis of the third latch output signal MCK3. For example, R3, G3, and B3 may be applied to respective data terminals of the third group of latches, and CK7, CK8, and CK9 may be applied to clock terminals of the third group of latches.

Figures 6, 7:
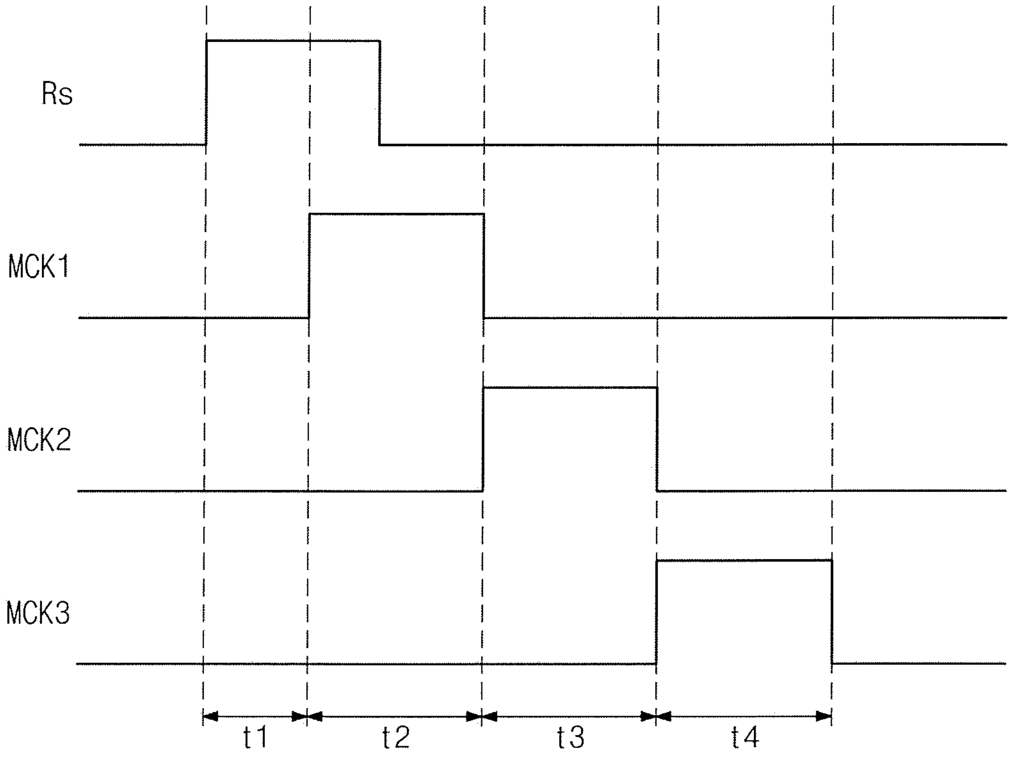
FIG. 6 is a table illustrating a phase difference between latch output signals according to a delay signal of FIG. 4.
FIG. 7 is a timing diagram of a latch output signal on the basis of a first direction according to an exemplary embodiment of the inventive concept.

FIG. 6 is a table illustrating a phase difference between latch output signals according to a delay signal Ts of FIG. 4.

Referring to FIGS. 4 to 7, the timing controller 100 of FIG. 1 generates a delay signal Ts based on a charging rate state of data voltages applied to pixels.

In an exemplary embodiment, the timing controller 100 outputs a delay signal Ts having one logic value among logic values “00” to “11”, to the clock adjustment unit 413. For example, the delay signal Ts may include a 2 bit value that indicates one of four different phase differences. In this case, the clock adjustment unit 413 determines a phase difference between latch output signals as one of first to fourth phase differences P1 to P4 in response to the delay signal Ts of the logic values “00” to “11”. Herein, as it goes from the first phase difference P1 to the fourth phase difference P4, a phase difference between latch output signals becomes greater. That is, a phase difference between latch output signals according to the delay signal Ts having the logic value “00” is the smallest and a phase difference between latch output signals according to the delay signal Ts having the logic value “11” is the largest. As an example, logic values of “00”, “01”, “10”, and “11” could indicate phase differences of 45, 90, 135, and 180 degrees, respectively.

Figure 8:
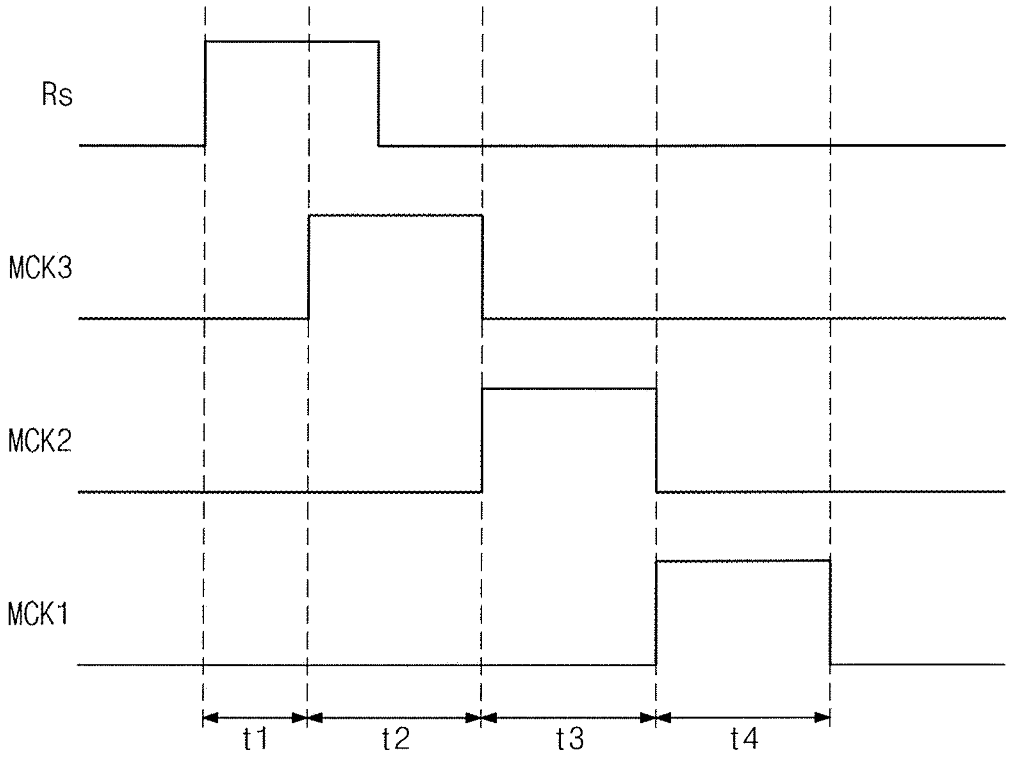
FIG. 8 is a timing diagram of a latch output signal on the basis of a second direction according to an exemplary embodiment of the inventive concept.
Figure 9:
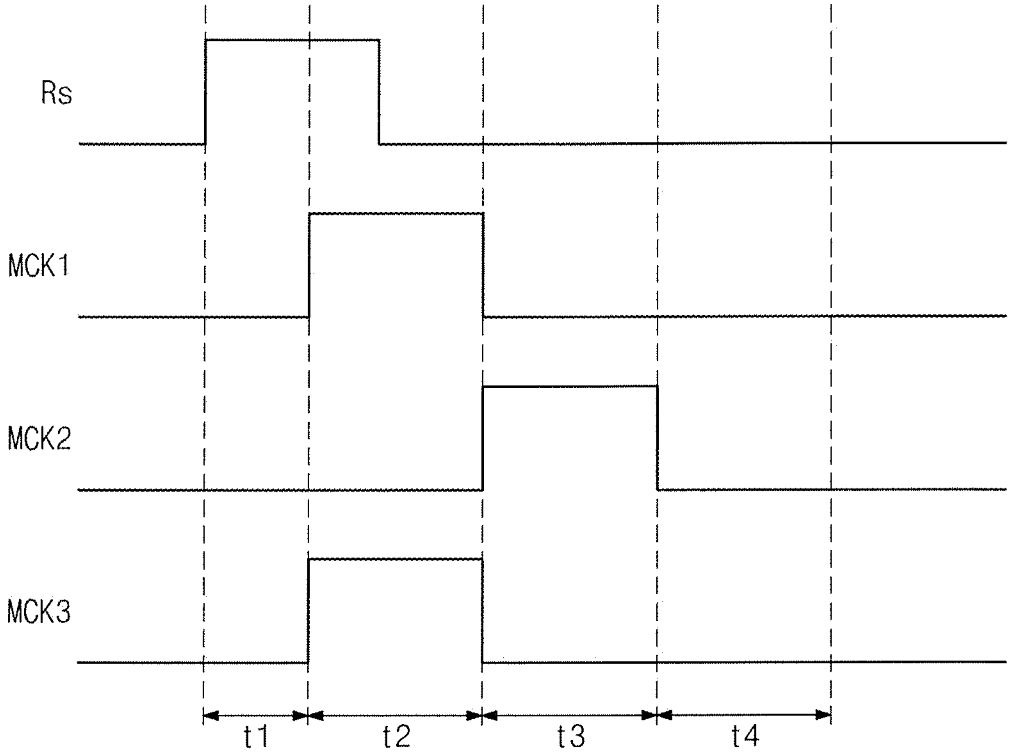
FIG. 9 is a timing diagram of a latch output signal on the basis of a third direction according to an exemplary embodiment of the inventive concept.

FIGS. 7 to 9 are timing diagrams illustrating an activation order of latch output signals based on an output control signal provided from a timing controller.

FIG. 7 is a timing diagram of a latch output signal based on a first direction according to an embodiment of the inventive concept. FIG. 8 is a timing diagram of a latch output signal based on a second direction according to an embodiment of the inventive concept. FIG. 9 is a timing diagram of a latch output signal based on a third direction according to an embodiment of the inventive concept.

According to an embodiment of the inventive concept, an output start signal Rs is a signal for controlling operations of a plurality of latch output signals. Additionally, the output start signal Rs controls operations of first to third latch output signals MCK1 to MCK3. Moreover, although it is described with reference to FIGS. 7 to 9 that the output start signal Rs is activated once, the inventive concept is not limited thereto. The output start signal Rs may have a plurality of activation states during one horizontal period 1H in which one row of TFTs are turned on. That is, during the one horizontal period 1H, a timing shown in FIGS. 7 to 9 may be repeated.

First, referring to FIGS. 4, 5, and 7, the data integrated circuit 410_*k* may output data voltages from the latches of the first to third latch groups U1 to U3 on the basis of a first direction. Herein, the first direction may progress from a direction closest to the gate driving circuit 200 to a direction farthest therefrom. The clock adjustment unit 413 may sequentially output the first to third latch output signals MCK1 to MCK3 in response to an output control signal Vd indicating the first direction.

In more detail, during a first interval t1, the output start signal Rs shifts into an activation level. For example, during the first interval t1, the output start signal Rs transitions to an activation level.

During a second interval t2, the first latch output signal MCK1 shifts into an activation level in response to an activation level of the output start signal Rs. For example, the first latch output signal MCK1 transitions to the activation level after the output start signal Rs transitions to the activation level. The first to third latches Lt1 to Lt3 included in the first latch group U1 output the first to third digital image signals DA1 to DA3 simultaneously in response to the first latch output signal MCK1 being at the activation level. Additionally, after a first latch output signal, that is, the first latch output signal MCK1, is activated, the output start signal Rs shifts into a deactivation level after a predetermined time. For example, the output start signal Rs transitions to the deactivation level a predetermined time after the first latch output signal MCK1 transitions to the activation level.

During a third interval t3, the first latch output signal MCK1 shifts into a deactivation level and the second latch output signal MCK2 shifts into an activation level. The fourth to sixth latches Lt4 to Lt6 included in the second latch group U2 output the fourth to sixth digital image signals DA4 to DA6 simultaneously (or at substantially the same time) in response to the second latch output signal MCK2 being at the activation level.

During a fourth interval t4, the second latch output signal MCK2 shifts into a deactivation level and the third latch output signal MCK3 shifts into an activation level. The seventh to ninth latches Lt7 to Lt9 included in the third latch group U3 output the seventh to ninth digital image signals DA7 to DA9 simultaneously (or at substantially the same time) in response to the third latch output signal MCK3 being at the activation level.

As mentioned above, the first to third latch groups U1 to U3 may sequentially output digital image signals based on a first direction according to the first to third latch output signals MCK1 to MCK3.

Additionally, as mentioned above, although it is described that the first to third latch output signals MCK1 to MCK3 have a phase difference of 180° from each other, the phase difference therebetween may be adjusted in response to a delay signal Ts. For example, the phase difference may be less than 180° so that the active portions of the latch output signals MCK1 to MCK3 overlap with one another. In another example, the phase difference is greater than 180° so that there is a time delay between the active portions of the latch output signals MCK1 to MCK3.

Referring to FIGS. 4, 5, and 8, the data integrated circuit 410_*k* may output the data voltages of the first to third latch groups U1 to U3 based on a second direction. Herein, the second direction may progress from a direction far from the gate driving circuit 200 to a direction adjacent thereto. The clock adjustment unit 413 may sequentially output the third to first latch output signals MCK3 to MCK1 in response to an output control signal Vd indicating the second direction.

In this case, after the seventh to ninth digital image signals DA7 to DA9 are simultaneously outputted (or output at substantially the same time) from the third latch group U3, the fourth to sixth digital image signals DA4 to DA6 are simultaneously outputted (or output at substantially the same time) from the second latch group U2. After that, the first to third digital image signals DA1 to DA3 are simultaneously outputted (or output at substantially the same time) from the first latch group U1.

That is, in comparison to the timing diagram shown in FIG. 7, digital image signals may be outputted in respectively opposite directions in the timing diagram shown in FIG. 8. That is, a data integrated circuit of FIG. 7 provides data voltages in the order from pixels adjacent to the gate driving circuit 200 of FIG. 1 to pixels far therefrom. On the other hand, a data integrated circuit of FIG. 8 provides data voltages in the order from pixels far from the gate driving circuit 200 of FIG. 1 to pixels adjacent thereto.

Referring to FIGS. 4, 5, and 9, the data integrated circuit 410_*k* may output the digital image signals of the first to third latch groups U1 to U3 based on a third direction. Herein, the third direction may be a direction starting from the both ends of the data integrated circuit 410_*k* and then moving toward the center part. The clock adjustment unit 413 may output the first to third latch output signals MCK1 to MCK3 in response to an output control signal Vd indicating the third direction. That is, at least one pair of latch groups U1 and U3 among the first to third latch groups U1 to U3 may simultaneously output (or output at substantially the same time) corresponding digital image signals in response to a latch output signal having the same phase.

In this case, the clock adjustment unit 413 simultaneously (or at substantially the same time) shifts the first and third latch output signals MCK1 and MCK3 into an activation level in response to an output control signal Vd indicating the third direction. For example, the first and output signals MCK1 and MCK3 are activated during together during a same period. After that, as the first and third latch output signals MCK1 and MCK3 shift into a deactivation level, the clock adjustment unit 413 shifts the second latch output signal MCK2 into an activation level. As a result, data voltages may be outputted to pixels in a direction from both ends of the data integrated circuit 410_*k* toward the center part.

However, the inventive concept is not limited thereto. For example, in order for facing one point of the left or right on the basis of the center part of the data integrated circuit 410_*k*, the latch unit 412 may output digital image signals toward the one point from the both ends of the data integrated circuit 410_*k*. That is, the latch unit 412 may adjust the output timing of digital image signals variously on the basis of latch output signals outputted from the clock adjustment unit 413. For example, the second latch output signal MCK2 could be activated during the second interval t2, and then the first and third latch output signals MCK1 and MCK3 could be activated during the third time interval t3.

In an exemplary embodiment, the main clock signal MCK is active for a first period, and the clock adjustment unit 413 performs an operation on the main clock signal MCK to generate a plurality of latch output signals that can be potentially active at different parts of the first period. For example, the main clock signal MCK could be inactive during time interval t1 and active throughout time intervals t2-t4. The clock adjustment unit 413 may include logic gates and delay gates to generate the output latch signals MCK1 to MCK3 from the main clock signal MCK. For example, the first output latch signal MCK1 of FIG. 7 may be generated by applying a control signal to a first input of an AND gate of the clock adjustment circuit 413, applying the main clock signal MCK to a second input of the AND gate, setting the control signal to an active level during the second time interval t2, and setting the control signal to an inactive level during the third and fourth time intervals t3 and t4. The second output latch signal MCK2 of FIG. 7 may then be generated by outputting the first output latch signal MCK1 to a first delay unit (e.g., a buffer amplifier) of the clock adjustment unit 413. The third latch signal MCK3 of FIG. 7 may then be generated by outputting the second output latch signal MCK2 to a second delay unit (e.g., a buffer amplifier) of the clock adjustment circuit 413. In an exemplary embodiment, the clock adjustment unit 413 includes a pulse generator to generate the latch output signals.

As mentioned above, the data integrated circuit 410_*k* may separately apply data voltages for displaying an image to pixels connected to one gate line instead of applying the data voltages simultaneously. Additionally, although it is described with reference to FIGS. 7 and 9 that a data integrated circuit outputs data voltages according to the first to third directions, the inventive concept is not limited thereto.

According to an embodiment of the inventive concept, a data integrated circuit may adjust the output timing of data voltages. As a result, the overall driving reliability of a display device may be improved.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A display device comprising:

a plurality of pixels connected to a plurality of data lines;

a data driving circuit configured to output a plurality of data voltages to the plurality of data lines in response to a main clock signal and a clock signal; and a timing controller configured to output a plurality of image signals, the main clock signal, a delay signal and the clock signal, wherein the data driving circuit comprises:

a shift register configured to output a plurality of latch clock signals that are sequentially activated in response to the clock signal;

a latch circuit configured to latch the plurality of image signals in response to the plurality of latch clock signals and output a plurality of digital image signals in response to a plurality of latch output signals;

an output circuit configured to convert the plurality of digital image signals to the plurality of data voltages; and a clock generator configured to receive the main clock signal and the delay signal, divide the main clock signal to generate the plurality of latch output signals, and output a first latch output signal and a second latch output signal among the plurality of latch output signals, wherein the clock generator adjusts a phase difference between the plurality of latch output signals in response to the delay signal, wherein the latch circuit comprises:

a first latch group configured to latch a first subset of the plurality of image signals based on a first subset of the latch clock signals and output a plurality of first digital image signals of the plurality of digital image signals in response to the first latch output signal during a first period within one horizontal period; and a second latch group configured to latch a second subset of the plurality of image signals based on a second subset of the latch clock signals and output a plurality of second digital image signals of the plurality of digital image signals in response to the second latch output signal during a second period within the same one horizontal period, and wherein the first period is not overlapped with the second period.

2. The display device of claim 1, wherein the latch circuit further comprises a third latch group configured to output a plurality of third digital image signals of the plurality of digital image signals in response to a third latch output signal from the clock generator.

3. The display device of claim 1, wherein the first latch group simultaneously outputs the plurality of first digital image signals in response to the first latch output signal, and wherein the second latch group simultaneously outputs the plurality of second digital image signals in response to the second latch output signal.

4. The display device of claim 3, wherein the output circuit converts the plurality of first digital image signals and the plurality of second digital image signals to the plurality of data voltages.

5. The display device of claim 1, wherein the timing controller further outputs an output control signal that determines an output order and the clock generator outputs the plurality of latch output signals in response to the output control signal.

6. The display device of claim 1, wherein the first latch group includes a plurality of latches, and wherein each of the latches receives a corresponding one of the first subset of the latch clock signals, and outputs a corresponding one of the plurality of digital image signals in response to the first latch output signal.

7. The display device of claim 1, wherein the shift register includes a cascade of flip flops sharing the clock signal in which an output of each of the flip flops is connected to a data input of a next one of the flip flops in the cascade.

8. An electronic device comprising:

a plurality of pixels connected to a plurality of data lines;

a data driving circuit configured to output a plurality of data voltages to the plurality of data lines in response to a main clock signal and a clock signal; and a timing controller configured to output a plurality of image signals, the main clock signal, a delay signal and the clock signal, wherein the data driving circuit comprises:

a latch circuit configured to latch the plurality of image signals in response to a plurality of latch clock signals and output a plurality of digital image signals in response to a plurality of latch output signals;

an output circuit configured to convert the plurality of digital image signals to the plurality of data voltages; and a clock generator configured to receive the main clock signal and the delay signal, divide the main clock signal to generate the plurality of latch output signals, and output a first latch output signal and a second latch output signal among the plurality of latch output signals, wherein the clock generator adjusts a phase difference between the plurality of latch output signals in response to the delay signal, wherein the latch circuit comprises:

a first latch group configured to latch a first subset of the plurality of image signals based on a first subset of the latch clock signals and output a plurality of first digital image signals of the plurality of digital image signals in response to the first latch output signal during a first period within one horizontal period; and a second latch group configured to latch a second subset of the plurality of image signals based on a second subset of the latch clock signals and output a plurality of second digital image signals of the plurality of digital image signals in response to the second latch output signal during a second period within the same one horizontal period, and wherein the first period is not overlapped with the second period.

9. The electronic device of claim 8, wherein the latch circuit further comprises a third latch group configured to output a plurality of third digital image signals of the plurality of digital image signals in response to a third latch output signal from the clock generator.

10. The electronic device of claim 8, wherein the first latch group simultaneously outputs the plurality of first digital image signals in response to the first latch output signal, and wherein the second latch group simultaneously outputs the plurality of second digital image signals in response to the second latch output signal.

11. The electronic device of claim 10, wherein the output circuit converts the plurality of first digital image signals and the plurality of second digital image signals to the plurality of data voltages.

12. The electronic device of claim 8, wherein the timing controller further outputs an output control signal that determines an output order and the clock generator outputs the plurality of latch output signals in response to the output control signal.

13. The electronic device of claim 8, wherein the first latch group includes a plurality of latches, and wherein each of the latches receives a corresponding one of the first subset of the latch clock signals, and outputs a corresponding one of the plurality of digital image signals in response to the first latch output signal.

14. The electronic device of claim 7, wherein the data driving circuit further comprises:

a shift register configured to output the plurality of latch clock signals that are sequentially activated in response to the clock signal.

15. The electronic device of claim 14, wherein the shift register includes a cascade of flip flops sharing the clock signal in which an output of each of the flip flops is connected to a data input of a next one of the flip flops in the cascade.

16. An electronic device comprising:

a controller configured to output a plurality of control signals; and a display module configured to display an image in response to the plurality of control signals, wherein the display module comprises:

a plurality of pixels connected to a plurality of data lines;

a timing controller configured to output a plurality of image signals, a main clock signal, a delay signal and a clock signal; and a data driving circuit configured to output a plurality of data voltages to the plurality of data lines in response to the plurality of image signals, the main clock signal and the clock signal; and wherein the data driving circuit comprises:

a latch circuit configured to latch the plurality of image signals in response to a plurality of latch clock signals and output a plurality of digital image signals in response to a plurality of latch output signals;

an output circuit configured to convert the plurality of digital image signals to the plurality of data voltages; and a clock generator configured to receive the main clock signal and the delay signal, divide the main clock signal to generate the plurality of latch output signals, and output a first latch output signal and a second latch output signal among the plurality of latch output signals, wherein the clock generator adjusts a phase difference between the plurality of latch output signals in response to the delay signal, wherein the latch circuit comprises:

a first latch group configured to latch a first subset of the plurality of image signals based on a first subset of the latch clock signals and output a plurality of first digital image signals of the plurality of digital image signals in response to the first latch output signal during a first period within one horizontal period; and a second latch group configured to latch a second subset of the plurality of image signals based on a second subset of the latch clock signals and output a plurality of second digital image signals of the plurality of digital image signals in response to the second latch output signal during a second period within the one horizontal period, and wherein the first period is not overlapped with the second period.

17. The electronic device of claim 16, wherein the first latch group simultaneously outputs the plurality of first digital image signals in response to the first latch output signal, and wherein the second latch group simultaneously outputs the plurality of second digital image signals in response to the second latch output signal.

18. The electronic device of claim 17, wherein the output circuit converts the plurality of first digital image signals and the plurality of second digital image signals to the plurality of data voltages.

* * * * *